3,629,304
17α-ALKYNYL - 11β,13β - DIALKYLGONA-1,3,5(10)-TRIENE - 3,17β-DIOL 3-CYCLOALKYL ETHERS, COMPOSITIONS AND METHOD
John S. Baran, Morton Grove, and Ivar Laos, Skokie, Ill., assignors to G. D. Searle & Co., Chicago, Ill.
No Drawing. Filed June 16, 1969, Ser. No. 833,810
Int. Cl. C07c *169/08*
U.S. Cl. 260—397.5                                4 Claims

ABSTRACT OF THE DISCLOSURE

3 - hydroxy - 11β,13β - dialkylgona - 1,3,5(10) - trien-17-ones are allowed to react with a cycloalkyl halide and the resulting 3-cycloalkyl ethers are contacted with a lower alkyne to afford the resulting 17α-alkynyl-11β,13β-dialkylgona - 1,3,5(10) - triene - 3,17β - diol 3-cycloalkyl ethers, which compounds are potent estrogens.

---

The present invention is concerned with novel potent estrogenic steroids characterized by an 11β-alkyl group and, more particularly, with 17α-alkynyl-11β,13β-dialkylgona-1,3,5(10)-triene-3,17β-diol 3-cycloalkyl ethers represented by the following structural formula

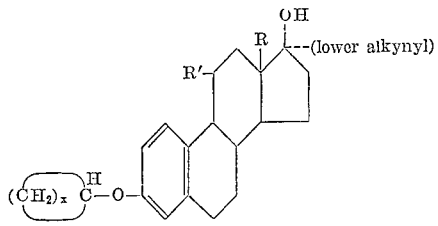

wherein R and R' are lower alkyl radicals and $x$ is an integer greater than three and less than six.

The lower alkyl radicals represented in the foregoing structural formulae are typified by methyl, ethyl, propyl, butyl, pentyl, hexyl, heptyl and the branched-chain groups isomeric therewith.

Representative of the lower alkynyl radicals denoted in the foregoing formula are ethynyl, propynyl, butynyl, pentynyl, hexynyl, heptynyl and the corresponding branched-chain groups.

The cycloalkyl radicals denoted by the $(CH_2)_x$ term are, typically, cyclopentyl and cyclohexyl.

The novel compositions of this invention, by virtue of the 11β-alkyl substituent and the cycloalkyl group attached to the 3-position, are unusually potent estrogenic substances and display the further advantage of having a prolonged duration of activity. These compounds are thus useful as ingredients in compositions adapted for purposes necessitating the use of a potent estrogen. The instant compounds are also potent pituitary inhibitors. These compounds are, furthermore, potent both by injection and by oral administration.

The estrogenic property of the instant compounds is specifically illustrated by the activity of 17α-ethynyl-11β-methylestra - 1,3,5(10) - triene - 3,17β-diol 3-cyclopentyl ether when assayed by the following procedure:

The method used is adapted from that described by Peterson et al., J. Endocrinology, 29, 255 (1964). This test depends upon the fact that the removal of one ovary from young rats causes a stimulation of pituitary gonadotrophin secretion and a resultant hypertrophy of the remaining ovary. This test thus serves to measure the inhibition of pituitary gonadotrophin secretion. The details are as follows:

The test compound dissolved or suspended in corn oil is administered to a group of 72-day old female rats for 14 days beginning on the day of hemi-castration. On the day following the last injection the animals are sacrificed and the remaining ovary is removed, cleaned of extraneous tissue and weighed. A group of control animals is treated with corn oil alone. The degree of inhibition is calculated from the differences in ovarian weights between the treated and control animals. Compounds are considered active if they produce a significant decrease ($P<0.05$) in ovarian weight as determined from the Wilcoxon Rank Sum test. Ovarian weight responses are converted to percentage values, calculated in the following manner:

Percent decrease in ovarian
$$\text{weight} = (C-T)/(C-K) \times 1000$$

where $C$ = mean weight of the left ovary from current corn oil-treated hemi-castrated control rats,
$T$ = means weight of the left ovary from the treated group of animals
$K$ = 35.4, a constant, the mean weight of left ovaries accumulated from a large number of 72-day old intact rats treated with corn oil.

On this basis the ovarian weight of the intact controls ($K$) represents a value that would indicate 100% inhibition of the hypertrophy shown by the current hemi-castrated controls. This latter group is assigned a value of 0%. Using these percentage values as the response, the potency of a compound relative to the standard inhibitor, norethynodrel is estimated by comparing the dose-response line of the test compound to that obtained from the accumulated norethynodrel data.

The pituitary-inhibiting property of the instant compounds is demonstrated by the activity of 17α-ethynyl-11β-methylestra-1,3,5(10)-triene-3,17β-diol 3-cyclopentyl ether when tested by the following method:

Young adult rats weighing about 200–250 g. are overiectomized, then treated daily for 30 days, starting on the day of the operation, with a corn oil solution or suspension of the test compound. The animals are sacrificed on the day following the last treatment and the pituitary glands are removed for follicle stimulating hormone assay.

The follicle stimulating hormone assay is a modification of the ovarian augmentation test described by Steelman and Pohley, Endocrinology, 53, 604 (1953). In this test a group of four 23-day old female rats is injected twice daily for 3 days with aliquot portions of saline extracts of the pituitaries taken from the donor animals. A similar group of control animals is treated with a standard follicle stimulating hormone preparation. Human chorionic gonadotrophin in the total amount of 50 I.U. per animal is administered to each group in order to augment the ovarian response and to mask any effect of lutenizing hormone which may be present in the extracts. The combined weight of both ovaries taken on the day after the last injection serves as the index of response. Follicle stimulating hormone potencies are calculated from response curves for the standard and pituitary extracts. The pituitary content of follicle stimulating hormone is then ploted against the dose of the compound and compared to the dose response line for estrone. The potency is thus expressed as a percentage of estrone.

The latter test depends upon the fact that ovariectomy results in an increase in pituitary follicle stimulating hormone which reaches a plateau in 4 weeks and remains at a high level thereafter. The ability of a compound to inhibit this increase in follicle stimulating hormone following ovariectomy is determined by comparison of dose response curves of the compound with the standard, estrone.

The compounds of this invention are conveniently manufactured by a two-step process involving first the reaction of a 3-hydroxy-11β,13β-dialkylgona-1,3,5(10)-trien-17-one of the following structural formula

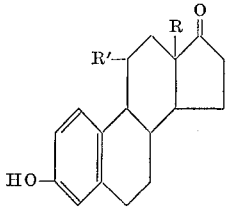

wherein R and R' are as hereinbefore defined, with a cycloalkyl halide, preferably in the presence of a suitable acid acceptor, to afford the corresponding cycloalkyl ether of the following formula

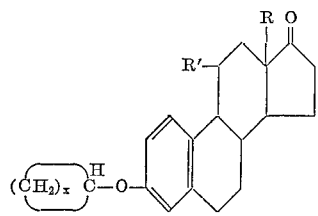

wherein R, R' and $x$ are as hereinbefore defined, followed by alkynylation of the 17-keto group, thus affording the instant compounds represented by the following formula

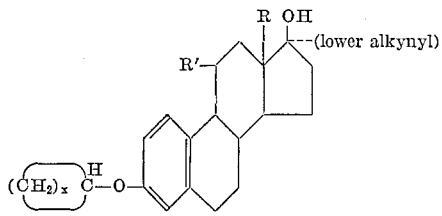

wherein R, R' and $x$ have the same meanings as hereinbefore indicated. That process is specifically exemplified by the reaction of 3-hydroxy-11β-methylestra-1,3,5(10)-trien-17-one with cyclopentyl iodide in the presence of potassium carbonate to afford the corresponding 3-cyclopentyl ether. That ether is contacted with lithium acetylide in the form of its ethylene diamine complex, under an atmosphere of acetylene, thus producing 3-cyclopentyloxy-17α-ethynyl-11β-methylestra-1,3,5(10)-trien-17β-ol.

An additional utility for the instant compounds involves their use as agents for control of the rodent population. This chemisterilant use is currently under investigation by Dr. George E. Short.

The potent estrogens of this invention can be administered also in conjunction with other potent hormonal agents, e.g. androgens or progestins, for uses which involve the need for such combinations, e.g. inhibition of ovulation, etc.

The novel estrogenic substances of this invention can be used in combination with a variety of pharmaceutically acceptable carriers. These compositions can be administered either orally or parenterally. For oral administration, tablets, lozenges, dragees, pills or powders are suitable while aqueous solutions, non-aqueous solution or suspensions are appropriate for parenteral administration. Acceptable pharmaceutical carriers are exemplified by gelatin capsules, sugars such as lactose or sucrose, starches such as corn starch or potato starch, cellulose derivatives such as sodium carboxymethyl cellulose, ethyl cellulose, methyl cellulose or cellulose acetate phthalate, gelatin, talc, calcium phosphates such as dicalcium phosphate or tricalcium phosphate, sodium sulfate, calcium sulfate, polyvinylpyrrolidone, acacia, polyvinyl alcohol, stearic acid, alkaline earth metal stearates such as magnesium stearate, vegetable oils such as peanut oil, cottonseed oil, sesame oil, olive oil, corn oil or oil of theobroma, water, agar, alginic acid, benzyl alcohol, isotonic saline and phosphate buffer solution as well as other non-toxic compatible substances used in pharmaceutical formulations.

In the compositions of this invention the novel estrogenic compounds are present in amounts envisioned to produce the desired effect. This amount can vary from approximately 0.0001 to about 10 mg. and preferably is present in each dosage unit to the extent of approximately 0.001 to about 5 mg. The daily dosage of these compounds will be in the amount of approximately 0.0001 to about 30 mg. and, most preferably, from about 0.001 mg. to about 10 mg.

The invention will appear more fully from the examples which follow. These examples are given by way of illustration only and are not to be construed as limiting the invention either in spirit or in scope as many modifications both in materials and methods will be apparent to those skilled in the art. In these examples temperatures are given in degrees centigrade (° C.) and quantities of materials in parts by weight unless otherwise noted.

EXAMPLE 1

To a solution of 5 parts of 3-hydroxy-11β-methylestra-1,3,5(10)-trien-17-one in 120 parts of ethanol is added successively 15 parts of anhydrous potassium carbonate and a solution of 5 parts of cyclopentyl iodide in 40 parts of ethanol. The resulting reaction mixture is heated and stirred at the reflux temperature in a nitrogen atmosphere for about 4 hours, at the end of which time another portion of 5 parts of cyclopentyl iodide dissolved in 40 parts of ethanol is added. Heating and stirring is continued for an additional 4 hours and the inorganic salts are then removed by filtration. Concentration of the solution by distillation under reduced pressure affords a residual material, which is dissolved in approximately 1000 parts of ethyl acetate. The resulting organic solution is washed with water until neutral, then dried over anhydrous sodium sulfate and concentrated under reduced pressure until the product begins to crystallize. At the end of that time the solution is allowed to stand in order to permit completion of crystallization. The resulting product is collected by filtration and dried, thus affording 3-cyclopentyloxy-11β-methylestra-1,3,5-(10)-trien-17-one, melting at about 209–211.5°. Nuclear magnetic resonance peaks are observed at about 51, 57, 62 and 284 cycles per second.

EXAMPLE 2

A suspension of 10 parts of the 30% lithium acetylide-70% ethylene diamine complex with 112 parts of tetrahydrofuran, in a nitrogen atmosphere, is cooled to 0° by means of an ice bath. To that mixture is then added, with stirring over a period of about 20 minutes, a solution of 2.8 parts of 3-cyclopentyloxy-11β-methylestra-1,3,5(10)-trien-17-one in 54 parts of tetrahydrofuran. The reaction mixture is placed under an atmosphere of acetylene and stirred at approximately 0° for about 3 hours. Decomposition of the reaction mixture by careful addition of water results in precipitation of the lithium salts as a gummy mass. The organic solution is separated by decantation and the inorganic salts are washed with fresh tetrahydrofuran. The tetrahydrofuran solutions are combined and concentrated to dryness under reduced pressure. The resulting residue is dissolved in ether and the ether solution is washed with water until neutral, then dried over anhydrous sodium sulfate and concentrated to dryness under reduced pressure, thus affording 3-cyclopentyloxy - 17α - ethynyl-11β-methylestra-1,3,5(10)-trien-17β-ol as a solid foam. This product exhibits nuclear magnetic resonance peaks, in deuterochloroform, at about 50, 57, 61, 157 and 283 cycles per second and also is represented by the following structural formula

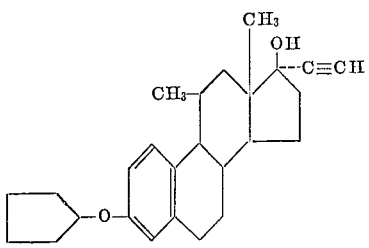

EXAMPLE 3

When an equivalent quantity of lithium propynylide is substituted in the procedure of Example 2, there is obtained 3 - cyclopentyloxy-11β-methyl-17α-propynylestra-1,3,5(10)-trien-17β-ol.

EXAMPLE 4

By substituting an equivalent quantity of cyclohexyl iodide and otherwise proceeding according to the processes described in Example 1, there is produced 3-cyclohexyloxy-11β-methylestra-1,3,5(10)-trien-17-one.

EXAMPLE 5

When an equivalent quantity of 3-cyclohexyloxy-11β-methylestra-1,3,5(10)-trien-17-one is substituted in the procedure of Example 2, there is produced 3-cyclohexyloxy-11β-17α-ethynylestra-1,3,5(10)-trien-17β-ol.

EXAMPLE 6

A typical composition is the following tablet containing 0.1 mg. of active ingredient and adapted for oral administration:

|  | Mg. |
| --- | --- |
| 3-cyclopentyloxy - 17α - ethynyl-11β-methyl-estra-1,3,5(10)-trien-17β-ol | 0.1 |
| Filler [e.g. anhydrous dibasic: |  |
|     Calcium phosphate | 100–140 |
|     Calcium acetate | 4–5 |
|     Corn starch | 30–60 |
|     Dibasic sodium phosphate] | 6.7 |
| Binder, e.g. polyvinylpyrrolidone | 5–6 |
| Lubricant, e.g. hydrogenated castor oil | 0.8–2 |

What is claimed is:
1. A compound of the formula

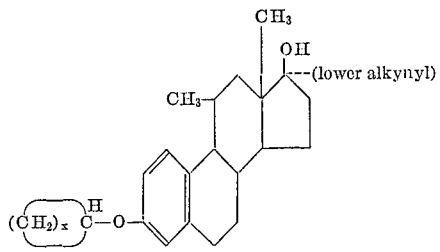

wherein $x$ is an integer greater than 3 and less than 6.

2. As in claim 1, a compound of the formula

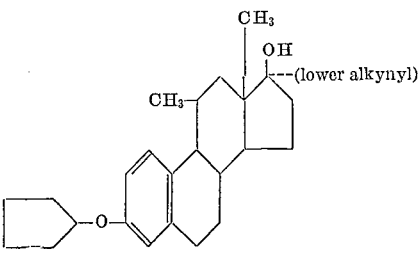

3. As in claim 1, a compound of the formula

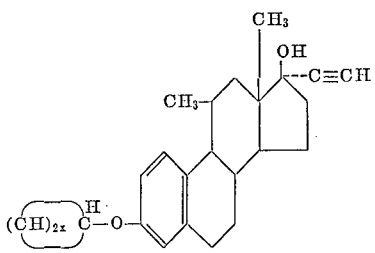

wherein $x$ is an integer greater than 3 and less than 6.

4. As in claim 1, the compound which is 17α-ethynyl-11β-methylestra-1,3,5(10)-triene-3,17β-diol 3-cyclopentyl ether.

References Cited

UNITED STATES PATENTS

| 3,159,543 | 12/1964 | Ercoli | 260—397.4 |
| 3,465,010 | 9/1969 | Baran | 260—397.5 |

ELBERT L. ROBERTS, Primary Examiner

U.S. Cl. X.R.

260—397.45

UNITED STATES PATENT OFFICE
CERTIFICATE OF CORRECTION

Patent No. 3,629,304  Dated December 21, 1971

Inventor(s) John S. Baran and Ivar Laos

It is certified that error appears in the above-identified patent and that said Letters Patent are hereby corrected as shown below:

Column 1, line 39, "formulae" should be -- formula --.

Column 2, line 18, "means" should be -- mean --.

Column 3, line 66, "solution" should be -- solutions --.

Column 5, line 31, "11β-17α-ethynylestra" should be -- 11β-methyl-17α-ethynylestra- --.

Column 6, Claim 3 formula "$(CH)_{2x} \overset{H}{C}\text{-}O\text{-}$" should be -- $(CH_2)_x \overset{H}{C}\text{-}O\text{-}$ --.

Signed and sealed this 4th day of July 1972.

(SEAL)
Attest:

EDWARD M. FLETCHER, JR.
Attesting Officer

ROBERT GOTTSCHALK
Commissioner of Patents